United States Patent
Groenendaal et al.

(10) Patent No.: US 6,635,729 B1
(45) Date of Patent: Oct. 21, 2003

(54) PROCESS FOR THE PREPARATION OF WATER-SOLUBLE π-CONJUGATED POLYMERS

(75) Inventors: Lambertus Groenendaal, Sinaai (BE); Friedrich Jonas, Aachen (DE); Tom Cloots, Londerzeel (BE); Frank Louwet, Diepenbeek (BE)

(73) Assignees: Bayer Aktinegesellschaft, Leverkusen (DE); Agfa-Gevaert N.V., Mortsel (BE)

( * ) Notice: Subject to any disclaimer, the term of this patent is extended or adjusted under 35 U.S.C. 154(b) by 0 days.

(21) Appl. No.: 09/767,474

(22) Filed: Jan. 23, 2001

(30) Foreign Application Priority Data

Feb. 3, 2000 (DE) .......................... 100 04 725

(51) Int. Cl.[7] ............................ C08F 128/06
(52) U.S. Cl. ........................................ 526/256
(58) Field of Search ........................ 526/256

(56) References Cited

U.S. PATENT DOCUMENTS

| | | | |
|---|---|---|---|
| 4,959,430 A | 9/1990 | Jonas et al. | 339/257 |
| 4,987,042 A | 1/1991 | Jonas et al. | 339/213 |
| 5,035,926 A | 7/1991 | Jonas et al. | 339/393.1 |
| 5,111,327 A | 5/1992 | Blohm et al. | 526/256 |
| 5,300,575 A | 4/1994 | Jonas et al. | 440/186 |
| 5,463,056 A | 10/1995 | Jonas | 628/350 |
| 5,766,515 A | 6/1998 | Jonas et al. | 686/500 |
| 6,083,635 A | 7/2000 | Jonas et al. | 686/690 |
| 6,084,040 A | 7/2000 | Jonas et al. | 825/535 |

OTHER PUBLICATIONS

Journal of Electroanalytical Chemistry, 443, (month unavailable) 1998, pp. 217–226, Olivier Stéphan, Philippe Schottland, Pierre–Yves Le Gall, Claude Chevrot, Clarisse Mariet, Michel Carrier, "Electrochemical Behaviour of 3,4–ethylenedioxythiophene functionalized by a sulphonate group. Application to the preparation of poly(3,4–ethylene-dioxythiophene) having permanent cation–exchange properties".

J. Chim. Phys. 95, (month unavailable) 1998, 95, pp. 1168–1171, O. Stéphan, P. Schottland, P.–Y. Le Gall and C. Chevrot, "New cation–exchange material based on a sulfonated 3,4–ethylenedioxythiophene monomer".

Advanced Materials, 9 No. 14, (month unavailable) 1997, Mario Leclerc and Karim Faïd, "Electrical and Optical Properties of Processable Polythiophene Derivatives: Structure–Property Relationships". pp. 1087–1094.

Polymer Preprints, vol. 38, No. 2, Sep. 1997, Dean M. Welsh, Anil Kumar and John R. Reynolds, "Easily Functionalized 3,4–Ethylenedioxythlophene".

Handbook of Conducting Polymers (Ed. Skotheim, T.A.), Marcel Dekker: New York, (month unavailable) 1986, vol. 1, pp. 45–57, Sándor Pekker and András Jánossy, "Chemistry Of Polyacetylene Doping".

Journal of Electroanalytical Chemistry, Nr. 443, (month unavailable) 1998, pp. 217–226, O. Stephan et al, XP000995724.

*Primary Examiner*—Bernard Lipman
(74) *Attorney, Agent, or Firm*—Godfried R. Akorli; Diderico van Eyl

(57) ABSTRACT

The invention relates to a process for preparing water-soluble π-conjugated polymers by polymerizing, in aqueous solution using an oxidant, monomeric thiophene derivatives of formula (I)

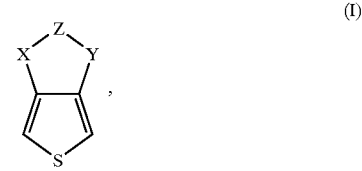

(I)

wherein

X and Y are identical or different and are O, S, or N—R',
Z is —$(CH_2)_m$—$CR^2R^3$—$(CH_2)_n$—,
$R^1$ is aryl, $C_1$–$C_{18}$-alkyl, or hydrogen,
$R^2$ is hydrogen or —$(CH_2)_s$—O—$(CH_2)_p$—$SO_3^-M^+$,
$R^3$ is —$(CH_2)_s$—O—$(CH_2)_p$—$SO_3^-M^+$,
$M^+$ is a cation,
m and n are identical or different and are an integer from 0 to 3,
s is an integer from 0 to 10, and
p is an integer from 1 to 1.

4 Claims, No Drawings

PROCESS FOR THE PREPARATION OF WATER-SOLUBLE π-CONJUGATED POLYMERS

BACKGROUND OF THE INVENTION

The invention relates to the preparation of water-soluble π-conjugated polymers by chemical polymerization in water.

The π-conjugated polymer class of compounds has been the subject matter of numerous publications in recent decades. They are also known as conductive polymers or synthetic metals.

Due to the considerable delocalization of the π-electrons along the main chain, these polymers exhibit interesting (nonlinear) optical properties and, after oxidation or reduction, are good electronic conductors. These compounds will therefore probably take on a leading and active role in various practical areas of application, such as, for example, in data storage, optical signal processing, suppression of electromagnetic interference and the conversion of solar energy, and in rechargeable batteries, light-emitting diodes, field-effect transistors, circuit boards, sensors and antistatic materials.

Examples of known π-conjugated polymers are polypyrroles, polythiophenes, polyanilines, polyacetylenes, polyphenylenes, and poly(p-phenylenevinylenes). They can be prepared by various chemical and electrochemical polymerization methods. For the industrial preparation of these π-conjugated polymers, chemical polymerization of the monomeric compounds is the most favorable process.

The development of π-conjugated polymers has been hindered for some time due to problems in their processing. Some of these problems have been solved by the introduction of the first soluble conjugated polymers, namely poly (3-alkylthiophenes). It was possible to process the latter in organic solvents and thus apply them to supports by spin coating. Due to increasing environmental consciousness, industry has concentrated on the development of water-soluble conjugated polymers. Again, polythiophenes functionalized with sulfonate groups were developed initially. Due to the sulfonate groups, these polythiophenes were more readily soluble in aqueous solutions and the use of undesired solvents, such as chloroform and acetonitrile, was avoided. The first water-soluble polythiophenes were quickly followed by other conjugated polymers, such as, for example, polypyrroles, polyanilines, polyphenylenes and poly(phenylenevinylenes).

One of the most successful and environmentally friendly π-conjugated polymers is poly(3,4-ethylenedioxythiophene) ("PEDT"). See EP-A 339,340. It has been converted into a processable aqueous dispersion by mixing with polystyrene sulfonic acid ("PSS"). See EP-A 440,957. The resultant mixture has excellent film-forming properties and combines high conductivity with high transparency.

Recently Chevrot et al. (*J. Electroanal. Chem.*, 1998, 443, 217–226, and *J. CHIM. PHYS*, 1998, 95, 1168–1171), published the synthesis of a novel 3,4-ethylenedioxythiophene derivative, 4-(2,3-dihydrothieno[3,4-b][1,4]dioxin-2-ylmethoxy)-1-butanesulfonic acid sodium salt ("EDT-S"). In spite of a number of attempts to polymerize this monomer in aqueous solution by electrochemical means, all attempts by Chevrot et al. to obtain a water-soluble homopolymer failed due to the high solubility of the resultant oligomer/polymer in water. Instead, the authors succeeded in preparing a 1:1 copolymer of EDT-S and 3,4-ethylenedioxythiophene. However, the derivative was insoluble in water.

Further thiophene derivatives which are likewise soluble in water are described in EP-A 628,560.

During a search for environmentally friendly materials having similar or improved electrical and/or optical properties compared with PEDT/PSS, the novel water-soluble π-conjugated polymers have been successfully prepared without using PSS.

SUMMARY OF THE INVENTION

The invention therefore relates to a process for the preparation of water-soluble π-conjugated polymers comprising polymerizing, in aqueous solution using an oxidant, monomeric thiophene derivatives of formula (I)

wherein
X and Y are identical or different and are O, S, or N—$R^1$,
Z is —$(CH_2)_m$—$CR^2R^3$—$(CH_2)_n$—,
$R^1$ is aryl, $C_1$–$C_{18}$-alkyl, or hydrogen,
$R^2$ is hydrogen or —$(CH_2)_s$—O—$(CH_2)_p$—$SO_3^-M^+$,
$R^3$ is —$(CH_2)_s$—O—$(CH_2)_p$—$SO_3^-M^+$,
$M^+$ is a cation,
m and n are identical or different and are an integer from 0 to 3,
s is an integer from 0 to 10, and
p is an integer from 1 to 1.

Examples of suitable cations $M^+$ are $H^+$, $Li^+$, $Na^+$, $K^+$, $Rb^+$, $Cs^+$, and $NH_4^+$. Particularly suitable cations are $Na^+$ and $K^+$.

DETAILED DESCRIPTION OF THE INVENTION

Preferred monomers in the process according to the invention are thiophene derivatives of the formula (I) in which
X and Y are O,
Z is —$(CH_2)_m$—$CR^2R^3$—$(CH_2)_n$—,
$R^2$ is hydrogen or —$(CH_2)_s$—O—$(CH_2)_p$—$SO_3^-M^+$,
$R^3$ is —$(CH_2)_s$—O—$(CH_2)_p$—$SO_3^-M^+$,
$M^+$ is a cation,
m and n are identical or different and are an integer from 0 to 3,
s is an integer from 0 to 10, and
p is an integer from 1 to 18.

Particularly preferred monomers in the process according to the invention are thiophene derivatives of the formula (I) in which
X and Y are O,
Z is —$(CH_2)$—$CR^2R^3$—$(CH_2)_n$—,
$R^2$ is hydrogen,
$R^3$ is —$(CH_2)_s$—O—$(CH_2)_p$—$SO_3^-M^+$,
$M^+$ is $Na^+$ or $K^+$,
n is 0 or 1,
s is 0 or 1, and
p is 4 or 5.

The monomeric compounds are known and their preparation is described in Chevrot et al., *J. Electroanal. Chem.*, 1998, 443, 217–226, Leclerc et al., *Adv. Mater.*, 1997, 9, 1087–1094 and Reynolds et al., *Polymer Preprints*, 1997, 38 (2), 320.

The polymerization of the monomeric compounds is carried out in water using suitable oxidants. Examples of suitable oxidants are iron(III) salts, particularly $FeCl_3$ and iron(III) salts of aromatic and aliphatic sulfonic acids, $H_2O_2$, $K_2Cr_2O_7$, $K_2S_2O_8$, $Na_2S_2O_8$, $KMnO_4$, alkali metal perborates, and alkali metal or ammonium persulfates, or mixtures of these oxidants. Further suitable oxidants are described, for example, in *Handbook of Conducting Polymers* (Ed. Skotheim, T. A.), Marcel Dekker: New York, 1986, Vol. 1, pages 46–57. Particularly preferred oxidants are $FeCl_3$, $Na_2S_2O_8$, and $K_2S_2O_8$, or mixtures thereof.

The process according to the invention is preferably carried out at a reaction temperature of from –20 to 100° C. Particular preference is given to reaction temperatures of from 20 to 100° C.

Further water-miscible solvents can also be added to the aqueous reaction mixture. Examples of suitable solvents are aliphatic alcohols, such as methanol, ethanol, isopropanol, and butanol, diacetone alcohols, ethylene glycol, and glycerol. Likewise suitable are aliphatic ketones, such as acetone and methyl ethyl ketone, and aliphatic nitriles, such as acetonitrile.

The resultant polythiophenes are very readily soluble in water.

Since the compounds were hitherto unknown, the invention furthermore relates to the polythiophenes of the formula (II)

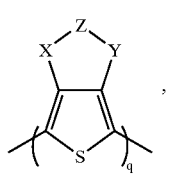

(II)

wherein
  X and Y are identical or different and are O, S, or N—$R^1$,
  Z is —$(CH_2)_m$—$CR^2R^3$—$(CH_2)_n$—,
    $R^1$ is aryl, $C_1$-$C_{18}$-alkyl, or hydrogen,
    $R^2$ is hydrogen or —$(CH_2)_s$—O—$(CH_2)_p$—$SO_3^-M^+$,
    $R^3$ is —$(CH_2)_s$—O—$(CH_2)_p$—$SO_3^-M^+$,
    $M^+$ is a cation,
    m and n are identical or different and are an integer from 0 to 3,
    s is an integer from 0 to 10,
    p is an integer from 1 to 18, and
    q is an integer from 2 to 10,000.

Preferred polymers are polythiophenes of the formula (II) in which X and Y are O and Z, $R^2$, $R^3$, $M^+$, m, n, s, p, and q are as defined above.

Particularly preferred polymers are polythiophenes of the formula (II) in which
  X and Y are O,
  Z is —$(CH_2)$—$CR^2R^3$—$(CH_2)_n$—,
    $R^2$ is hydrogen,
    $R^3$ is —$(CH_2)_s$—O—$(CH_2)_p$—$SO_3^-M^+$,
    $M^+$ is $Na^+$ or $K^+$,
    n is 0 or 1,
    s is 0 or 1,
    p is 4 or 5, and
    q is an integer from 3 to 1,000.

The polythiophenes of the formula (II) are in cationic form. The positive charges are not shown in the formula since the charges are delocalized over the entire molecule.

After the polymerization, the polythiophene solution can be subjected to further purification. This includes, in particular, desalination. The desalination is preferably carried out using ion exchangers, which in the simplest case are added directly to the polythiophene solution. Alternatively, desalination by column chromatography is also possible.

The invention furthermore relates to the use of the polythiophenes of the formula (II) for the production of electrically conductive coatings. To this end, the polythiophene solution can, after work-up, be applied to substrates by known casting or printing methods. Examples of casting methods are curtain coating and spin coating. Examples of printing methods are gravure printing, offset printing, and screen printing. Examples of substrates are glass and plastics, such as, for example, polycarbonates, polyesters, and polyacrylates.

Preferred layer thicknesses are from $10^{-2}$ to $10^2$ μm.

The surface resistance of layers of the polythiophenes of the formula (II) is between 1 and $10^{14}$ Ω/□, preferably between 10 and $10^9$ Ω/□.

In order to increase the conductivity of the coatings, additives can be added to the solutions. Suitable additives are described in EP-A 686,662.

In order to improve the mechanical properties of the layers with respect to adhesion and scratch resistance, binders and crosslinking agents can be added to the solutions. Suitable for this purpose are processes as described for the poly-3,4-ethylenedioxythiophene/polystyrenesulfonic acid system in EP-A 825,219.

Particularly important areas of application of the polythiophenes of the formula (II) are, for example
  data storage,
  optical signal processing,
  suppression of electromagnetic interference (EMI),
  conversion of solar energy,
  rechargeable batteries,
  electrodes,
  light-emitting diodes,
  field-effect transistors,
  sensors,
  electrochromic panes,
  antistatic materials, in particular films for the packaging of electronic components and support films for photographic films,
  coatings for copier drums, and
  through-plating of circuit boards and multilayers.

The polythiophenes according to the invention are preferably employed for the production of solid-state electrolyte capacitors based on tantalum, niobium, or aluminum. The capacitors are produced by the following process steps:

1. Electrochemical oxidation of the metal positive electrodes for the application of the insulating metal-oxide layer.
2. Impregnation and drying of the metal positive electrodes once or more than once with a solution of the polythiophenes according to the invention for the application of the conductive counterelectrode.

The capacitors obtained in this way are distinguished by low equivalent series resistances and good high-frequency properties.

EXAMPLES

In the following experiments, the sodium salt of 4-(2,3-dihydrothieno[3,4-b][1,4]dioxin-2-ylmethoxy)-1- butanesulfonic acid (EDT-S), prepared as described by Chevrot et al. (*J. Electroanal. Chem.*, 1998, 443, 217–226), was employed as monomer.

Example 1

Preparation of poly(4-(2,3-dihydrothieno[3,4-b][1,4] dioxin-2-ylmethoxy)-1-butanesulfonic acid) (PEDT-S) Using $FeCl_3$ as Oxidant 0.496 g of EDT-S (1.5 mmol) were dissolved in 18 ml of distilled water under argon. 0.97 g (6.0 mmol) of $FeCl_3$ were subsequently added in one portion. The solution was then stirred at room temperature ("RT") for 8 hours and heated at 100° C. for 3 hours, cooled and worked up. For work-up, the solution was diluted to 1% by weight with distilled water, 9 g of Lewatit® S100 (cationic ion exchanger from Bayer AG) and 9 g of Lewatit® MP 62 (anionic ion exchanger from Bayer AG) were added, and the mixture was stirred at RT for 4 hours. Removal of the ion exchangers by filtration gave a dark-blue polymer solution.

| | |
|---|---|
| Solids content: | 1% by weight |
| Iron content: | 0.0019% by weight |
| Sodium content: | 0.24% by weight |

1 g of the polymer solution was diluted with 1 g each of water, acetone, and methanol and applied to a polyethylene terephthalate film using a knife coater (wet film thickness 60 μm). The surface resistance of the layer dried at room temperature was $10^8$ Ω/□.

Example 2

Preparation of poly(4-(2,3-dihydrothieno[3,4-b][1,4] dioxin-2-ylmethoxy)-1-butanesulfonic acid) (PEDT-S) Using $Na_2S_2O_8$ as Oxidant A solution of $Na_2S_2O_8$ (0.267 g, 1.12 mmol) and $Fe_2(SO_4)_3$ (0.0025 g) in distilled water (25 ml) was degassed and stored under argon. The sodium salt of EDT-S (0.25 g, 0.76 mmol) was added in one portion, and the solution was stirred at RT for 24 hours. The mixture was then stirred at 100° C. for a further 2 hours and then cooled to RT. The dark-blue solution was diluted to a solids content of 1% with distilled water and stirred at RT for 1 hour with Lewatit® S 100 (5 g) and Lewatit® MP 62 (5 g). Removal of the ion exchangers by filtration gave a dark-blue polymer solution.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of water-soluble π-conjugated polymers comprising polymerizing, in aqueous solution using an oxidant, a monomeric thiophene derivative of formula (I)

(I)

wherein

X and Y are identical or different and are O, S, or N—$R^1$,
Z is —$(CH_2)_m$—$CR^2R^3$—$(CH_2)_n$—,
$R^1$ is aryl, $C_1$–$C_{18}$-alkyl, or hydrogen,
$R^2$ is hydrogen or —$(CH_2)_s$—O—$(CH_2)_p$—$SO_3^-M^+$,
$R^3$ is —$(CH_2)_s$—O—$(CH_2)_p$—$SO_3^-M^+$,
$M^+$ is a cation,
m and n are identical or different and are an integer from 0 to 3,
s is an integer from 0 to 10, and
p is an integer from 1 to 18.

2. A process according to claim 1 comprising polymerizing a monomeric thiophene derivative of formula (I) wherein X and Y are O,
Z is —$(CH_2)$—$CR^2R^3$—$(CH_2)_n$—,
$R^2$ is hydrogen,
$R^3$ is —$(CH_2)_s$—O—$(CH_2)_p$—$SO_3^-M^+$,
$M^+$ is $Na^+$ or $K^+$,
n is 0 or 1,
s is 0 or 1, and
p is 4 or 5.

3. A process according to claim 1 wherein the oxidant is $FeCl_3$, $Na_2S_2O_8$, or $K_2S_2O_8$, or a mixture thereof.

4. A process according to claim 1 wherein the polymerization is carried out at a reaction temperature of from 20 to 100° C.

\* \* \* \* \*